Dec. 13, 1960 T. HENSE 2,964,740

MAGNETOMECHANICAL MATRIX REGISTER AND INPUT DEVICE THEREFOR

Filed Aug. 25, 1958 3 Sheets-Sheet 1

INVENTOR
THEO HENSE

By Toulmin & Toulmin
Attorneys

INVENTOR
THEO HENSE

By Toulmin & Toulmin

Attorneys

MAGNETOMECHANICAL MATRIX REGISTER AND INPUT DEVICE THEREFOR

Filed Aug. 25, 1958 3 Sheets-Sheet 3

INVENTOR
THEO HENSE

By Toulmin & Toulmin

Attorneys

United States Patent Office 2,964,740

Patented Dec. 13, 1960

2,964,740

MAGNETOMECHANICAL MATRIX REGISTER AND INPUT DEVICE THEREFOR

Theo Hense, Wilhelmshaven, Germany, assignor to Olympia Werke A.G., Wilhelmshaven, Germany Filed Aug. 25, 1958, Ser. No. 756,876

Claims priority, application Germany Nov. 2, 1957

4 Claims. (Cl. 340—174)

This invention relates to a non-cyclic, static magnetomechanical matrix register in which the reading in of information data to be stored is effected mechanically by means of an input device associated therewith.

The terms "register" and "storage" are to be understood as defined in "High Speed Computing Devices" (HSCD) by Engineering Research Associates, Inc., McGraw-Hill Book Co. (1950), pages 295 and 303, respectively, et seq., and the terminology applied in this book is generally adopted throughout this specification.

Non-cyclic matrix storage registers are known in the art, wherein mechanically embodied data are stored with the aid of electromagnetical relays, and which are, therefore, generally referred to as relay registers (HSCD supra, page 311 et seq.).

The known relay registers, when in read-out position, yield the stored data in the form of electrical values, and the data may be read out several times without thereby erasing the information from the register. However, these multi-read-out registers require that a high number of relatively large size, high precision relays are utilized which makes the cost of their use in electromechanically operable typewriters or small calculating machines prohibitive.

Furthermore, the reliability of these known relay storage systems represents a critical problem, since they suffer from an excessive sensitivity to, for instance, vibrations or dust, as set forth in HSCD supra, page 313.

It is, therefore, the main object of my invention to provide a non-cyclic, static matrix storage register and an input device therefor, which are particularly suited for use in electromechanically operated writing and calculating machines, wherefor the register is much smaller and above all far less expensive than the known relay registers, and which novel type of register stores the mechanically incorporated data for such time as they are needed during the operation of the machine.

It is a further object of my invention to provide a matrix register of the type described which is particularly shock-proof, which fact is of special importance in office machines sometimes exposed to rougher handling, than could be sustained by the known relay registers.

These objects are achieved and the drawbacks of the known relay registers are avoided by the magnetomechanical matrix register and input device according to my invention which is characterized by a single large electromagnetic yoke, core, and coil arrangement serving to establish a main field of closed flux of magnetic lines of force, and by a plurality of storage elements of magnetically conductive material, which are so arranged as to form a plurality of magnetic resistances in the aforesaid field and which are normally retained in inoperative position by the forces of spring means which are counteracting the forces of the magnetic field and are larger than the latter when the elements are in said inoperative position.

Each of the aforesaid magnetic resistance may consist of an air gap between each storage element and the electromagnetical system, or in a cross sectional zone of the element, which zone is of non-magnetic or diamagnetic material such as brass. The magnetizable material is preferably soft iron. The elements made of the same can be rod- or pin-shaped.

The storage elements are so devised that when reading in a given information datum, a particular one of these elements corresponding to that given datum is mechanically displaced in such a manner from its inoperative position in the electromagnetic system that the air gap or other magnetic resistance existing between the particular element and the system is decreased so that a sufficient portion of the total magnetic lines of force of the system passes through the element to increase the magnetic pull exercised on the element beyond the counteracting elastic forces of said spring means, thereby retaining the element in operative position.

The particular element will be held in this operative position regardless of how often the stored datum is read out of the register. Also, a great number of elements may thus be brought into operative position without effecting the efficiency of the system. All elements of the register which are in operative position can be easily returned simultaneously to inoperative position by decreasing the strength of the common magnetic field sufficiently so that the same falls below the strength of the forces of the spring means associated with each element. This may, for instance, be effected by interrupting current flow through the coil means forming part of the electromagnetic system.

According to another important feature of the invention, the storage elements of magnetizable material are adapted simultaneously to actuate means for making and breaking electrical contact to close or open circuits. It is preferred to provide these electrical circuits in the form of printed circuits in order to simplify and decrease in number the often complicated and copious wiring of matrix registers. The contact means actuated by the storage elements and located in these circuits may thus serve to control the operation of pulse generating circuits and the like.

The preferably pin- or rod-shaped storage elements form, so to speak, displaceable secondary or short-circuiting cores between the opposite yokes of the electromagnetic system, as shall be described in detail hereinafter. At the same time they carry noses, arms or the like extrusions, preferably of insulating material, which serve for actuating the above mentioned contact means.

Separately displaceable selector means are associated in an input device according to the invention with the storage register and serve for selecting specific ones of the storage elements in the register for the storage of specific data. These selector means may be operated automatically, for instance, by step-by-step switch means. The selector means carry information transmission means which are in turn operable from a keyboard and the necessary mechanical parts connected therewith as shall be set forth in detail further below.

The invention will be further explained in detail in connection with the accompanying drawings in which.

Figure 3:
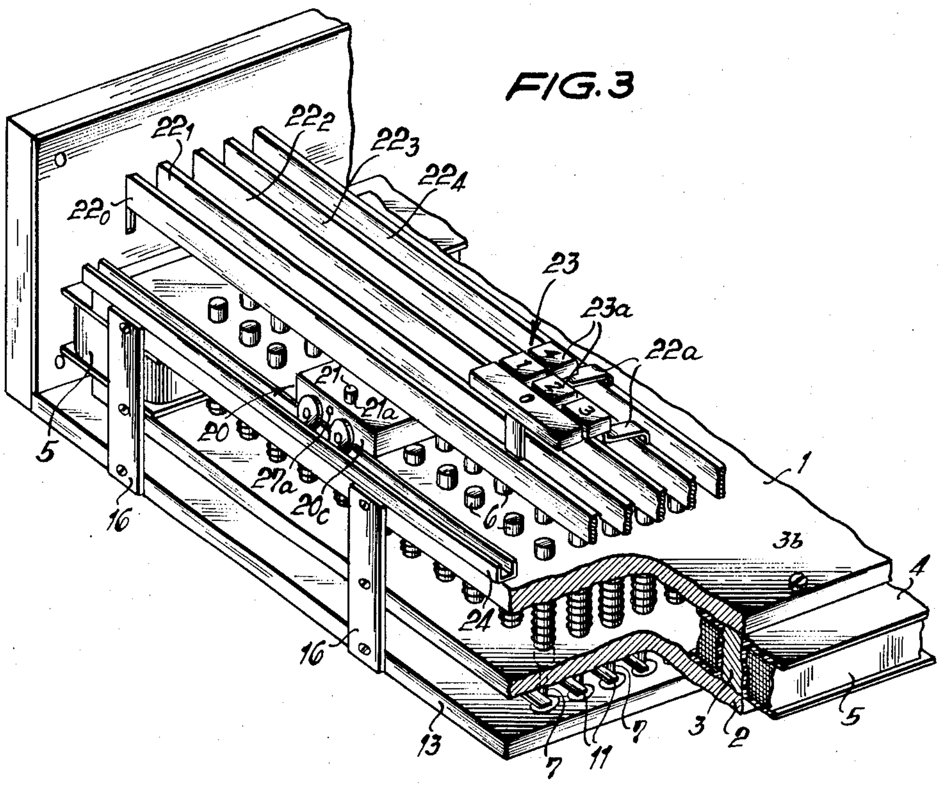
Fig. 3 is a fragmentary perspective view of the register according to the invention, and comprising a read-in device.
Figure 4:
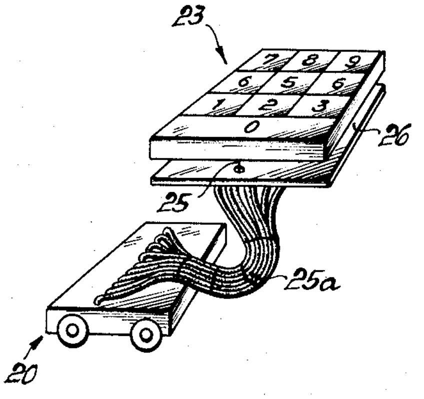
Fig. 4 shows a different embodiment of the read-in device shown in Figure 3, also in perspective view.
Figure 4A:
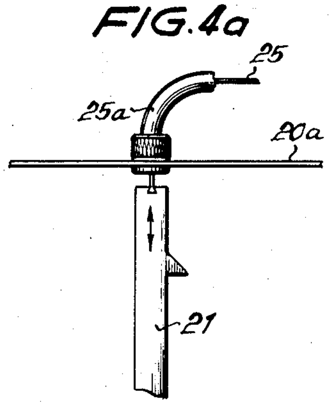
Figures 5, 5A, 6:
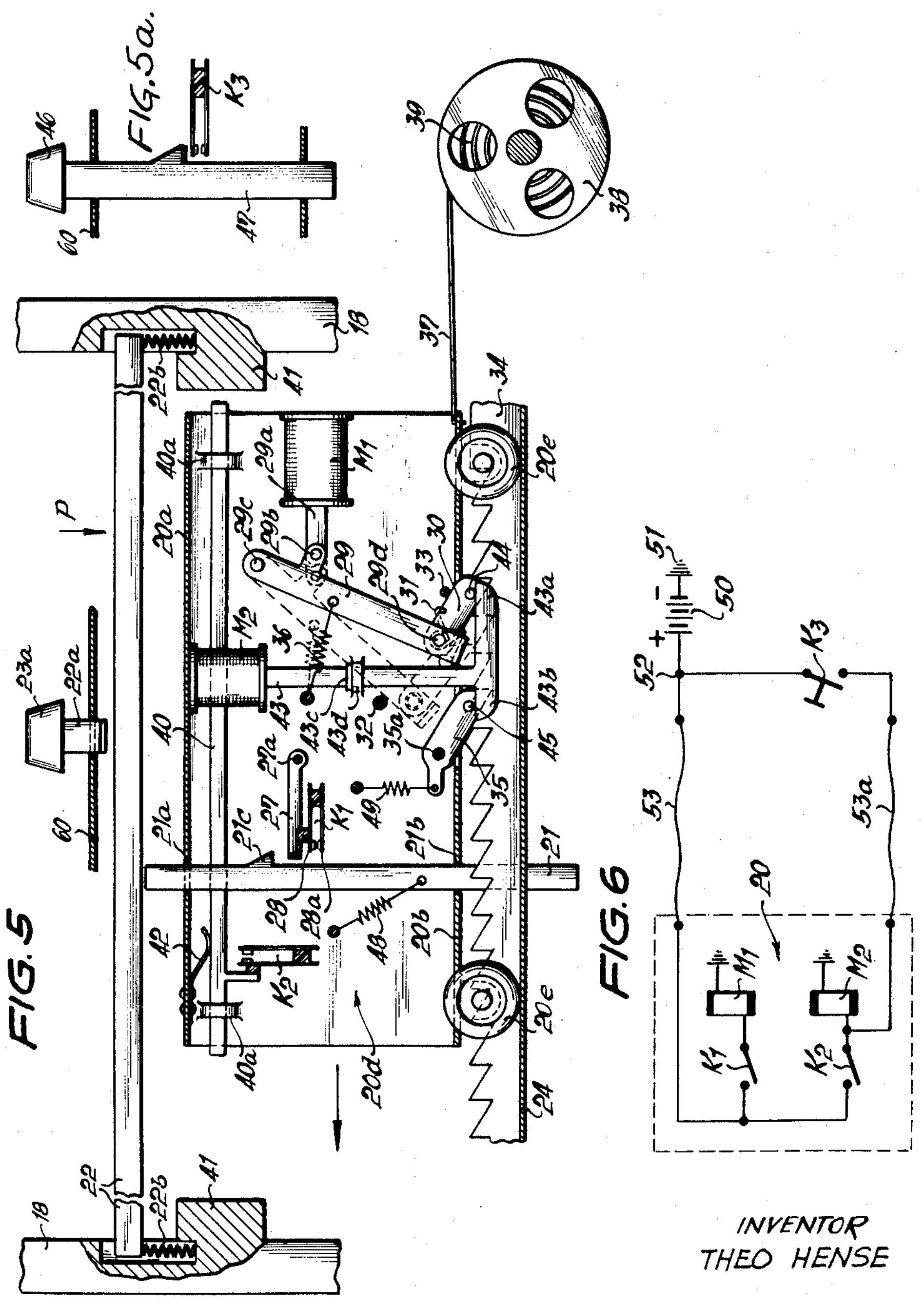

Fig. 4*a* shows a detail of the embodiment in Figure 4;

Figure 5 shows schematically the step-by-step switch means for displacing the input device and the register according to the invention as illustrated in Figures 3 and 4;

Figure 5*a* shows a detail of Figure 5 in perspective;

Fig. 6 shows schematically a wiring diagram for the operation of the input device illustrated in Figure 5.

In these figures like reference marks refer to like parts.

The system of magnetic flux in the arrangement according to the invention constitutes a closed magnetic circuit formed by two yokes of parallel plates 1 and 2 of magnetically conductive material, and at least two spacing members also of magnetizable material intermediate these plates, which members form the cores 3, 3*a* of electromagnetic coils 5 held in coil mountings 4. Direct electric current is supplied to the coils 5 on cores 3 and 3*a* from a D.C. source 5*a*.

As can be seen from Figure 3, the magnetic plate and core system 1—3—2—3*a* is mounted by means of holding members 16 above and parallel with a bottom plate 13 of insulating material.

Figure 1:
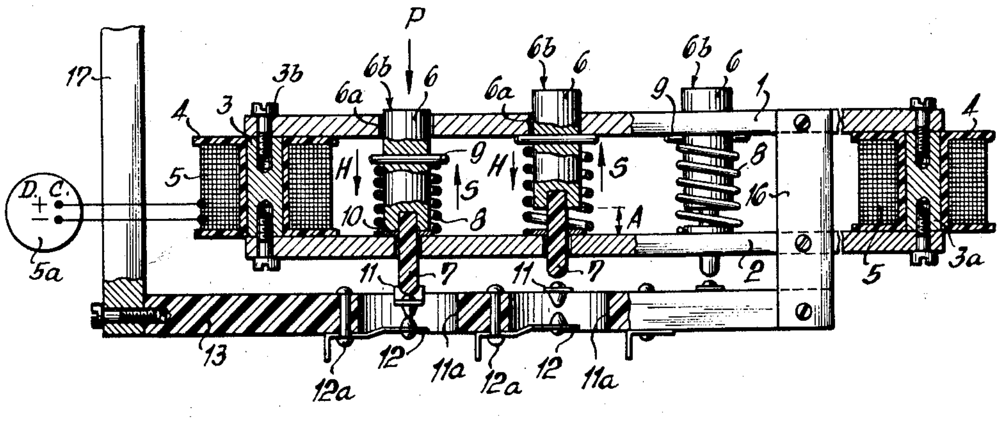
Figure 1 is a partially sectional fragmentary side view of the magnetomechanical matrix register according to the invention.
Figure 2:
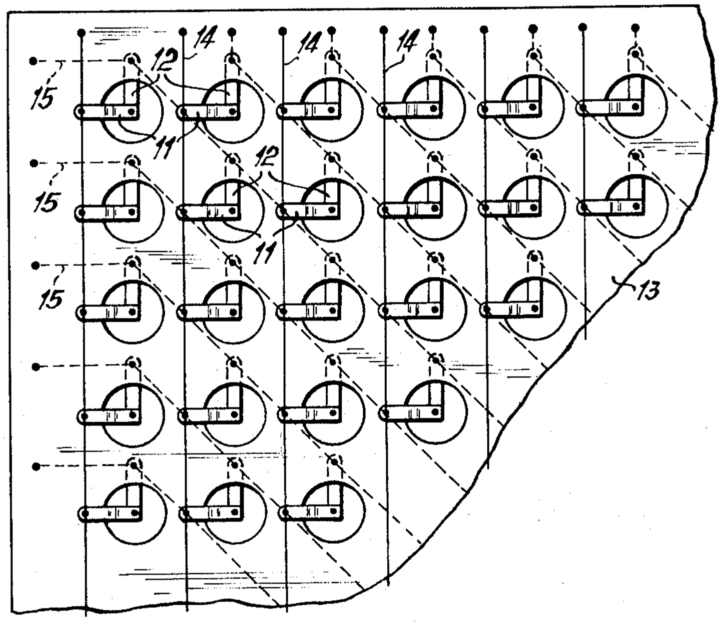
Figure 2 is a top view of a fragment of the bottom plate of the register shown in Figure 1.

Top plate 1 is provided with a number of bores, which are preferably in a line-and-column pattern as shown in Figure 2. In each bore 6*a* there is housed a storage element comprising a short cylindrical rod body 6 which is guided in the bore 6*a* and adapted for upward and downward movement therein. Each rod 6 bears a cross pin 9 below plate 1 thereby limiting the upward movement of rod 6, which movement is brought about by a spring 8 or similar resilient member resting with its lower end on the top surface of lower plate 2 and pressing with its upper end against cross pin 9, thereby urging rod 6 into its upper limit position as shown of the second rod 6 from the left in Figure 1. The spring force S is stronger than and counteracts the smaller magnetic field H which flows from plate 1 to plate 2 through rod 6 and attempts to pull the latter downwardly into contact with plate 2 so as to eliminate the air gap A between rod 6 and plate 2.

When rod 6 is depressed by an applied force P, this air gap A is reduced to a minimum determined by a thin disc 10 of non-magnetizable material such as brass, whereby the magnetic field force H is increased to become greater than spring force S. The rod 6 is then held by the excess magnetic forces in its lower end position as shown in the first rod 6 from the left in Figure 1.

At its lower end, rod 6 bears a contact pin 7 of insulating material which extends through a corresponding bore 2*a* in plate 2 downwardly for registration with the free end of a contact tongue 11 or the like mounted at the edge of a contact opening 11*a* in bottom plate 13 on the top surface of the latter.

A second contact tongue 12 is mounted at the lower surface of bottom plate 13 in a similar manner as tongue 11, for instance, by rivets 12*a*, and is adapted for establishing with its free end surface contact with the free end of contact tongue 11, when the latter is depressed downwardly into the contact opening 11*a*. This is the case, when rod 6 is depressed and held in its lowermost position as in the case of the first rod 6 from the left in Figure 1.

In order to save space, the contact tongues 11 and 12 which are of resilient, electrically conductive material, for instance, of spring steel or the like, are shown displaced by an angle of 90° relative to each other.

The necessary line connections are provided preferably as printed circuits on the top and the bottom surface of the bottom plate 13. Thus, as shown schematically in Figure 2, by way of example only, parallel leads 14 are provided on the top surface of plate 13 for connecting contact tongues 11 in each column (or line) of the register with each other, while diagonal leads 15 printed on the bottom surface of plate 13 connect contact tongues 12 in several parallel series with each other.

A numerical example will illustrate the manner in which the magnetomechanical system as illustrated in particular in Figures 1 and 2, functions.

The magnetomechanical matrix register according to the invention as described hereinbefore is provided with an input device as illustrated in Figures 3–6.

The simplest type of input system is that in which each index key of an input keyboard is coordinated with one particular storage element, i.e. with a determined rod 6 in the matrix register according to the invention.

This simple input system has the advantage that, after a given set of data has been read into the input device by depressing the corresponding datum keys, the information put in can easily be checked with a single glance, in particular, where each key is directly connected with a corresponding storage rod.

In this case the top end surfaces 6*b* of all storage rods 6 would be marked with symbols corresponding to the various digits to be stored.

However, in order to keep the dimensions of an office calculating machine or the like as small as possible, such machines are preferably provided with a keyboard comprising only the keys for a single decade of numerals 0 to 9 and a few auxiliary signs.

Figure 3 illustrates the combination of a magnetomechanical matrix register and a mechanical ten-key keyboard input device according to the invention.

The input device comprises a key-setting carriage 20 which bears ten setting pins 21 corresponding to the ten numerals of a decade. This carriage 20 moves longitudinally to the matrix register in marginal rails 24 only one of which is shown, and which are mounted along two opposite edges of the top plate 1 of the magnetomechanical register according to the invention.

Above the carriage 20 and aligned with each longitudinal row or line of storage elements 6 there are depressably mounted, in opposite end walls 18 of machine frame 17, data-setting bars $22_0$, $22_1$ etc., each of which is connected via members 22*a* to one of the ten keys 23*a* arranged in the form of a keyboard 23, and passes above one of the ten setting pins 21 in carriage 20. Thus, key "0" is connected via its linking member 22*a* to bar $22_0$, which bar passes above the pin 21 furthest to the left in carriage 20, as shown in Figure 3; key "1" is connected via a similar member (not shown) to bar $22_1$, key "2" in the same manner to bar $22_2$, key "3" via its member 22*a* to bar $22_3$, key "4" via another member 22*a* to bar $22_4$, and so forth.

The operation of the key-setting carriage 20 will now be explained in greater detail with the aid of Figure 5 of the drawings. When key 23*a* in this figure is depressed, it moves setting bar 22 downwardly in the direction of arrow P, and against the action of compression springs 22*b* housed in corresponding recesses of machine frame end walls 18. The bar 22 thereby depresses the pin 21, above which it is disposed, and which pin is guided in slots 21*a* and 21*b* in the top and bottom walls 20*a* and 20*b* respectively of carriage 20.

Each of setting pins 21 is provided with a nose 21*c* which protrudes above the flap 27. This flap 27 extends across the width of carriage 20 and is hingedly mounted on points 27*a* in the lateral walls 20*c* and 20*d* of carriage 20. Below flap 27 near the free edge of the same, there is mounted at one of the side walls of carriage 20, a circuit making contactor $K_1$ comprising the upper contact leaf spring or a similar resilient contact member 28 which urges flap 27 upwardly to hold the same in a position somewhat below noses 21*c* of pins 21.

As one of the pins 21 is moved downwardly, its lower end first contacts the upper surface 6*b* of the respective rod 6 above which it is positioned, causing the same to be held by the magnetic field between plates 1 and 2, as explained hereinbefore, whereupon, during the last part of its downward movement, the nose 21*c* of this pin 21 depresses flap 27 and the upper contact member 28 therebelow, so that the latter contacts lower contact member 28*a*, thereby closing contact at $K_1$ and establishing current flow through the circuit of step magnet $M_1$.

The energized magnet $M_1$ then attracts its core 29*a* and via articulated joint 29*b*, lever 29, which latter is pivotally mounted on pin 29*c* in the sidewalls of carriage 20, and held, when inoperative, in a position indicated in phantom lines in Figure 5 against a limiting stop 32 in wall 20*d*, due to the force of a traction spring 36. Lever 29 in operative position, after attraction by magnet $M_1$, is shown in full lines.

In the latter position, pawl 30 which is pivotally mounted at the lower free end of lever 29 about pin 29*d*, is urged downwardly by pressure spring 31 into one of the indentures of rack 34. The latter is rigidly mounted in the machine frame 17, so that during the movement of lever 29 from limiting stop 32 to the right until pawl 30 abuts against a second limiting stop 33, the carriage is caused to roll on its wheels 20*e* by one step (or tooth) toward the left.

Excessive movement of carriage 20 to the left is prevented by spring 31 pressing pawl 30 firmly into the respective indenture of rack 34.

As soon as the limit position at stop 33 is reached, a second pawl 35 is pulled by spring 49 about pivot 35*a* into another indenture of rack 34 and holds the carriage in the position thus reached against the pull of return traction spring 39 mounted on drum 38 and connected to carriage 20 by means of cable 37.

Upon releasing pressure on key 23*a*, in Figure 5, return spring 48 lifts pin 21 to its initial position, downward pressure on flap 27 is released and contact member 28 moves upwardly, thus opening contact $K_1$ and interrupting current flow through magnet $M_1$. Thereby, lever 29 is no longer attracted and is withdrawn by return spring 36 into inoperative position, whereby pawl 30 is pressed against the next adjacent tooth of rack 34 without fully entering the corresponding indenture. The carriage is, however, held in position as described above, against a movement to the right in Figure 5, due to the locking action of the second pawl 35.

Each further step to the left by carriage 20 further tensions return spring 38 via cable 37. Shortly before the last step toward the left is accomplished by carriage 20 (which step signifies the end of input during a given traverse of the carriage along rails 24) a contact rod 40 displaceably held in guides 40*a* in the upper part of carriage 20 comes up against abutment 41.

Thereby, this contact rod 40 is displaced toward the right during the subsequent last step of carriage 20 toward the left, and closes contact $K_2$, whereby current flow is established through magnet $M_2$. This magnet now raises lifting element 43, whereby the lower cross arms 43*a* and 43*b* of the latter lift pawls 30 and 35 by their respective cross pins 44 and 45 out of engagement with the indentures of rack 34. Carriage return spring 39 can now rotate drum 38 and pull the carriage via cable 37 back into starting position toward the right end of the machine. As the carriage arrives in its right hand end position, rod 40 bears against abutment 46 provided at the right end wall 18 of the machine, and is pushed to the left. Thereby, contact $K_2$ is caused to break the circuit of magnet $M_2$, and lifting element 43 is released and drops downwardly until its collar 43*c* comes to rest on the guiding sleeve 43*d* which is rigidly mounted at the carriage wall 20*c* and/or 20*d*. Thereby, the pawls 30 and 35 are permitted to drop again into the indentures of rack 34 with which they register at right hand end position of the carriage. The machine is then ready for a new input of data.

If, in an input operation, the full capacity of the register is not needed, the carriage must be returned to its right hand starting position prior to reaching its left hand end position. In this case, contact rod 40 does not contact abutment 41. Therefore, a separate resetting key 50 is provided on the keyboard 60. By depressing this key 50, a contact $K_3$ is closed which is in parallel circuit arrangement with contact $K_2$, and serves to establish current flow through magnet $M_2$ in the same manner. Magnet $M_2$ then effects the return of the carriage 20 to its right end starting position in the same manner as described above.

In Figure 6, the circuitry of magnets $M_1$ and $M_2$ is schematically illustrated. One pole of the direct current source 50 is connected to mass at 51, while the other is connected via point 52 and a flexible line, or a sliding contact means 53, to the carriage-borne contacts $K_1$ and $K_2$, while a branch line leads from point 52 via the stationary contact $K_3$ and flexible or sliding contact means 53*a* directly to one terminal of the coil of magnet $M_2$.

The input of data via the carriage 20 into the matrix register according to the invention may also be effected in a manner illustrated in Figure 4. In this embodiment, the head end of each pin 21 is connected to one end of a push wire 25 which is housed in a cable 25*a*, thus forming a release cable as used, for instance, with photographic cameras. The other end of the cable is directly connected to the underside of one of the keys 23*a* of keyboard 23. This arrangement replaces the data-setting bars 22 and connecting members 22*a* of the embodiment illustrated in Figures 3 and 5. Otherwise, all parts of the register and input device according to the invention remain the same.

It will be understood that this invention is susceptible to modification in order to adapt it to different usages and conditions, and, accordingly, it is desired to comprehend such modifications within this invention as may fall within the scope of the appended claims.

What I claim is:

1. For use in a magnetic mechanical matrix register used in data processing machines and having an electromagnetic system for producing a magnetic field and a plurality of data storing elements disposed in the magnetic field, an input device comprising a carriage movable above an electromagnetic system in such a manner as to scan during its movement data-storing elements, a step-by-step switching means for displacing said carriage stepwise over data-storing elements, and setting means borne by said carriage for selectively transferring one of those elements and registering with said carriage at a given step of the latter from inoperative to operative position in a magnetic field produced by an electro-magnetic system.

2. An input device as claimed in claim 1, wherein said setting means comprise a certain number of setting pins disposed in said carriage and adapted for scanning data-storing elements in an electromagnetic system, and a number of setting bars extending longitudinally in the direction of movement of said carriage and disposed perpendicularly displaceable thereto each above a different one of said setting pins, a stationary keyboard comprising a plurality of keys and connecting means between the keys of said keyboard and said bars so that upon actuation of one of said keys the corresponding bar is depressed via said connecting means and actuates the setting pin corresponding to the particular bar, which setting pin in turn transfers the data-storing element above which the carriage is stationed at that time from inoperative to operative position in an electromagnetic system.

3. An input device, as claimed in claim 2, wherein said connecting means are rigid strips fastened at one end to a key of said keyboard and at the other end to one of said setting bars.

4. An input device, as claimed in claim 3, wherein said setting means comprise a certain number of setting pins disposed in said carriage and adapted for scanning data-storing elements in an electromagnetic system, a stationary keyboard having a plurality of keys corresponding each to one of said setting pins, and several flexible push-wire connecting means, each of which connects one of the keys of said keyboard to one of said setting pins of said carriage so as to depress the respective pin when the corresponding key is actuated, thereby causing said pin to shift the data-storing element which happens to be positioned therebelow from inoperative to operative position in an electromagnetic system.

References Cited in the file of this patent

UNITED STATES PATENTS

| | | |
|---|---|---|
| 1,311,384 | Drew | July 29, 1919 |
| 2,322,563 | Bruno | June 22, 1943 |
| 2,814,031 | Davis | Nov. 19, 1957 |
| 2,816,254 | Canepa | Dec. 10, 1957 |